March 9, 1937.  C. W. FREDERICK ET AL  2,073,300
AUTOCOLLIMATING UNIT
Filed Nov. 29, 1932  3 Sheets-Sheet 2
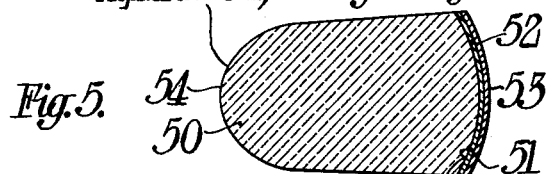
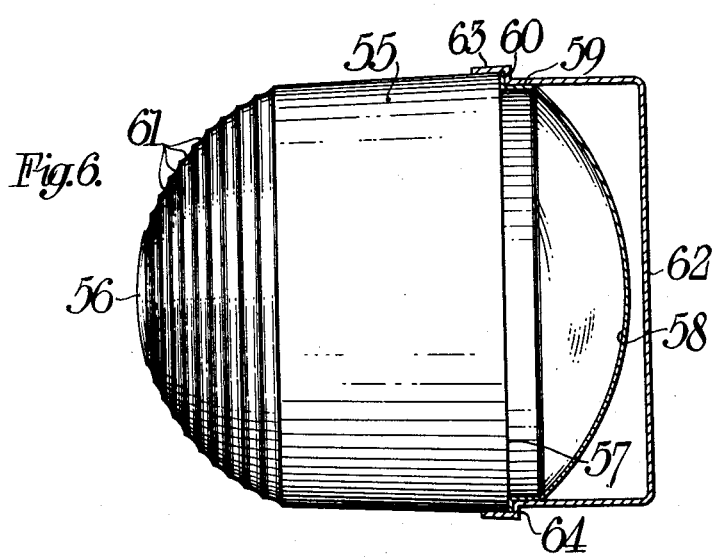
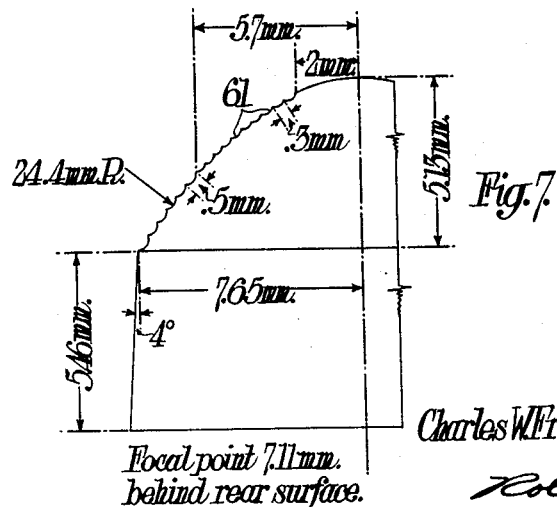
Inventors:
Charles W. Frederick & Richard W. Luce,
Rolla L. Carter
By Newton M. Perrins
Attorneys March 9, 1937.  C. W. FREDERICK ET AL  2,073,300
AUTOCOLLIMATING UNIT
Filed Nov. 29, 1932  3 Sheets-Sheet 3
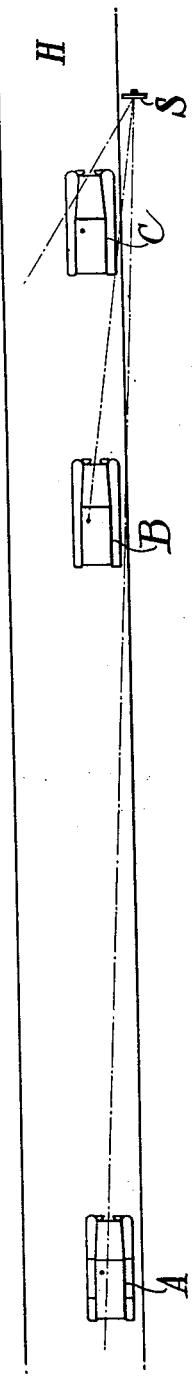
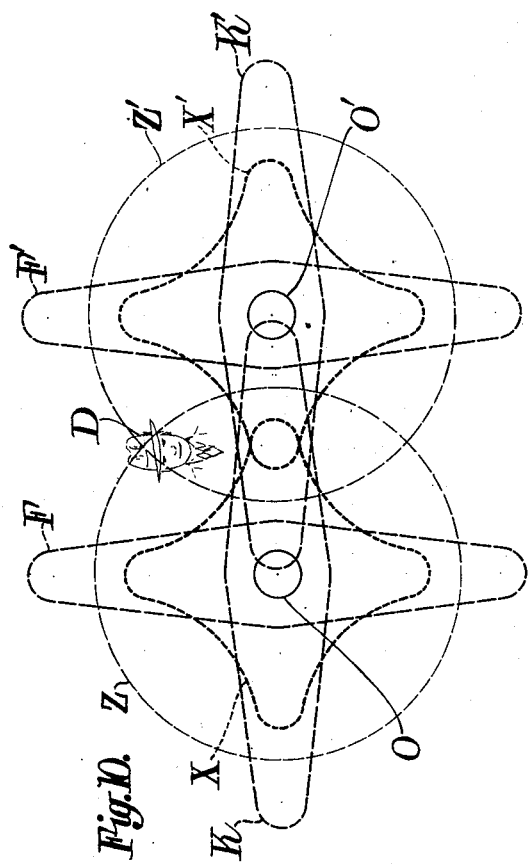
Inventors:
Charles W. Frederick &
Richard W. Luce,
By Rolla N. Carter
Newton M. Perrins
Attorneys Patented Mar. 9, 1937

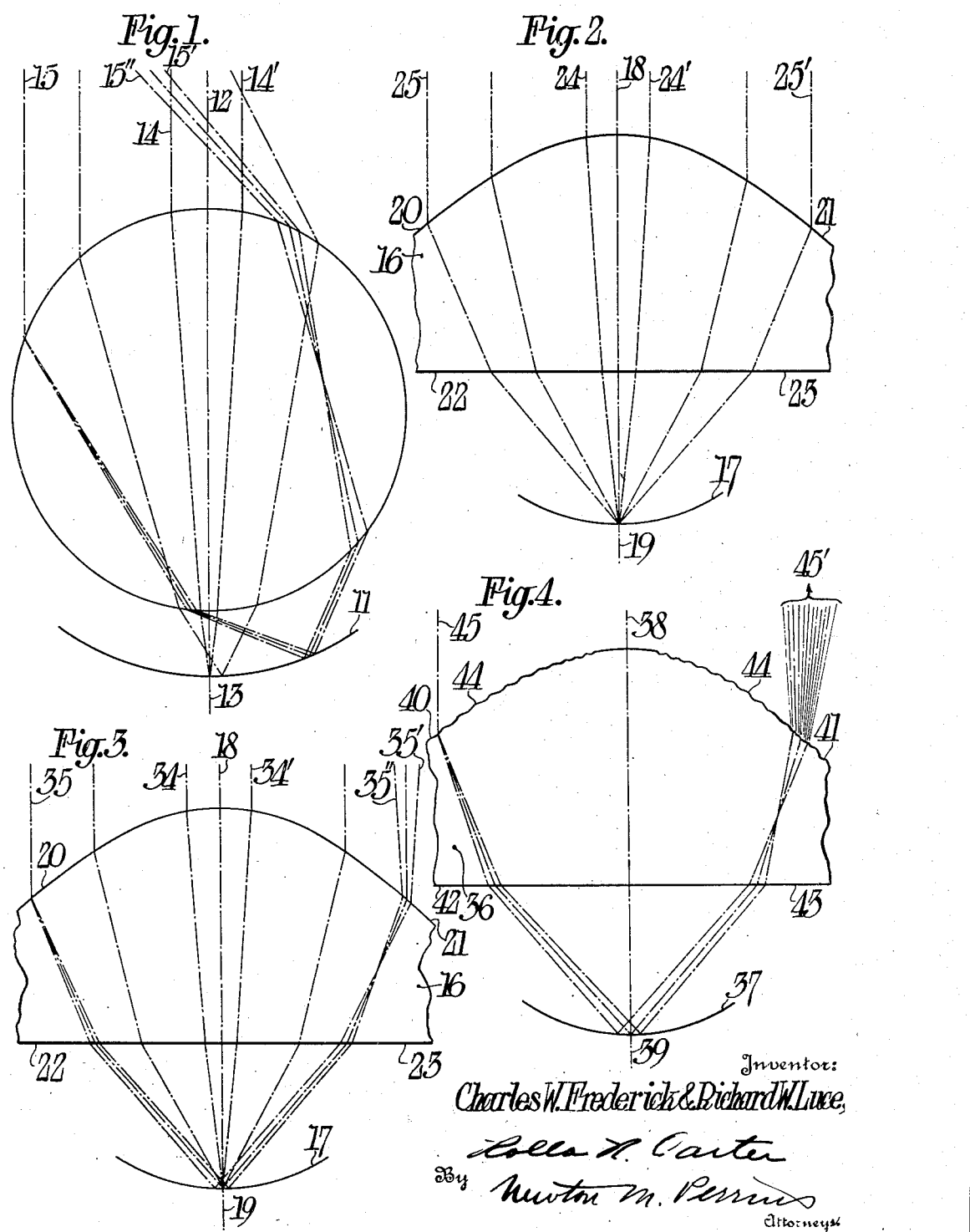

2,073,300

UNITED STATES PATENT OFFICE

2,073,300

AUTOCOLLIMATING UNIT

Charles W. Frederick, Rochester, N. Y., and Richard W. Luce, Elizabeth, N. J., assignors, by mesne assignments, to Eastman Kodak Company, Jersey City, N. J., a corporation of New Jersey Application November 29, 1932, Serial No. 644,802

13 Claims. (Cl. 88—82)

This application is filed as a continuation in part of our application, Serial #635,034 filed September 27, 1932.

The present invention relates to catadioptric devices and more particularly to improvements in the type of said devices ordinarily designated by the trade as reflector buttons, that is, reflector devices in which a single lens is associated with a reflector or in which a lens has its rear surface silvered so as to reflect light directed toward the device from a distant source, such as headlights of automobiles located in front of the device, back toward the source, so as to cause the device to appear illuminated when viewed from a position adjacent the light source or other nearby point in front of the device. Reflecting devices of this type are used in signs or warning signals along the roadside. They impart to the driver of a vehicle at night information as to the condition of the road ahead and make legends on advertising and other signs visible.

The object of our invention is to increase the optical efficiency in at least four particulars, first, chromatic aberration; second, control of the divergence of the reflected beam to effect a desired relation between the divergence of reflected light having axial incidence and that of reflected light having oblique incidence; third, rendering more nearly circular the sectional shape of an obliquely reflected beam; and fourth, compensating for manufacturing inaccuracies by introducing controlled diffusion into the reflected beam.

For the purpose of this specification "axially" incident light shall mean that the light falling on the reflecting unit is coming from a source located substantially on the axis of the unit and light reflected "axially" or "along the axis" shall mean that the reflected light, or beam of light, or cone of light, is substantially centered on the axis of the unit.

The catadioptric units, of which the legible part of the sign is composed, are, in fact, autocollimating devices, and in order that the legend may be usefully visible to the driver of an approaching vehicle, the headlights of which constitute the source of light, it is essential that the light be returned with a certain amount of spread and that the degree of spread increase at a rate depending on the location of the sign with respect to the line of travel of the automobile and coincidently with the increase in the angle of deviation of the incident light with respect to the axis of the sign. This requirement is due to the fact that the eyes of a motor vehicle operator are located some distance above the plane of the headlights and that inasmuch as in the majority of cases signs are located some distance offset from the line of travel, the angle of divergence required of the reflected beam with respect to the axis of the incident beam in order to include the driver's eyes increases coincidently with the increasing angle of deviation of the axis of the incident light with respect to the axis of the device itself, which is usually substantially parallel with the line of travel.

It has been customary to employ autocollimating units which are composed of a collecting lens and a reflecting concave mirror. The mirror may either be spaced from the lens or consist of a silver coating on the rear surface of the lens, dependent on the option of the designer. The collecting lenses used in such devices may be generally grouped under two headings, that is, lenses in which no attempt has been made to minimize spherical aberration, and lenses in which spherical aberration has been purposely minimized, as suggested in United States patents, Chretien #1,706,218 issued March 19, 1929, Treleaven #1,735,815 issued November 12, 1929, Churchill #1,102,138 issued June 30, 1914, and Bone #1,872,643 issued August 16, 1932. In practically all instances, the lenses employed within either group are of relatively high aperture and short focal length.

The autocollimating units utilizing lenses which do not minimize spherical aberration may be considered as further divided into two groups, to wit, those in which the lenses are double convex with the centers of curvature of the two convex surfaces coincident, the rear surfaces of which may or may not be reflective, which group may be termed concentric; and those other than concentric, which may be double-convex, concavo-convex or plano-convex. In both of these types of uncorrected units the divergence of axially returned light due to the inherent spherical aberration exceeds the requirements aforementioned, and in fact results in relative inefficiency. With obliquely incident light the aberrations, which are known as coma and astigmatism, are not present in the concentric type but are inherent in the non-concentric. The divergence of light obliquely incident is in the case of the concentric type of lenses due purely to spherical aberration and may or may not be excessive, depending upon the distance of the observer from the unit; while in the non-concentric type the divergence due to coma and astigmatism results in a reflected beam that in cross section is not of circular shape and one which if projected on a screen would show an irregular pattern. This irregularity in the cross sectional shape of the returned beam is objectionable because it results in a differential visibility of the unit or sign, depending upon the position of the observer with respect to vertical planes through the headlights.

In addition to the spherical aberration there also exists a color dispersion condition known as chromatic aberration, which is not so objectionable in devices employing lenses uncorrected for spherical aberration as it is in devices employing corrected lenses, particularly at substantially axial incidence of the light. The reason for this is the fact that with uncorrected lenses the color bands formed by the separation of the white light emerge at a considerable angle to the axis and are therefore out of the field of vision and are relatively weak because of the large angle of divergence.

However, if lenses are used in which the spherical aberration has been minimized, the returned light, which is axially incident, does not have sufficient divergence to satisfy the requirement, while the returned light, which is obliquely incident, has the same objectionable characteristics respecting the cross sectional shape of the beam as does the returned beam of obliquely incident light in the case of units employing the uncorrected non-concentric lens. Also in lenses of this character due to the sharpness of focus afforded by the reduction of spherical aberration, the emerging color bands formed by the chromatically separated light have so little divergence relative to the axis of the incident light that they are within the field of vision over a great range of distances and so intense as to be objectionable. The disadvantage due to the too little divergence of the returned beam may be easily overcome by impairing the sharpness of the focus upon the mirror to any desired degree either by departing from exact mathematical correction in the lens for spherical aberration or by locating the reflector out of focus axially and/or obliquely with respect to the lens. However, such impairment of the unit as a true autocollimating device will not be of sufficient degree or of correct nature to diminish appreciably the chromatic effect above referred to or to produce an oblique beam of substantially circular cross section.

By our invention, we provide a simple expedient coincidentally to obtain these and other desired results, namely, an absence of the objectionable chromatic effect, just the desired amount of concentration of the emergent beam for axially incident light and for various angles of obliqueness, and an oblique beam of substantially circular shape in cross section.

In brief, in accordance with our invention, the complete or partial correction of a simple lens for spherical aberration by any of the several well known methods is impaired so as to afford the desired spread of the axially reflected beam and in combination with the unavoidable oblique aberrations, coma and astigmatism, inherent in all lenses of the corrected type, to produce a beam of more regular shape in cross section and with a controlled amount of divergence, which divergence increases coincidentally with the increasing angle of obliqueness. This impairment is accomplished by an expedient which results in integration of the chromatically separated light and, therefore, in an absence of the chromatic effect. This expedient may conveniently be the providing of at least one of the refracting surfaces with a relatively minute intermittent deviation from the theoretically correct contour of the surface. For example, the surface may be provided with haphazard minute indentations in the nature of an orange peel effect, or it may be provided with definite departures from a continuous smooth surface in the nature of geometric designs arranged in an orderly or symmetrical manner.

We have found that roughening of the surface of the lens molding tool with a certain grade of emery powder to produce the orange peel effect upon the lens will produce a lens in which the roughened surface will tend to reunite the various colors into white light. The reuniting and other desirable effects are even better if the surface is provided with a series of concentric grooves of smooth sectional contour and each having its own particular radius and its own particular width. This treatment of the mold imparts to the surface of the lens a degree of relatively minute intermittent deviation from the theoretically correct contour of the lens. The mold may be treated in various ways and the precise manner in which it is done forms no part of the invention herein claimed. One simple way of forming the mold for producing concentric grooves in the lens is to make a hob and generate the concentric grooves upon this hob in the manner described in Patent No. 1,370,885 to Frederick et al. This hob is then used to sink the mold and the lenses molded therein will have the particular shape of the surface produced on the hob.

It will be obvious that these minute irregularities or optical inaccuracies in the surface of the lens form a number of exceedingly small refracting surfaces which serve to mix or diffuse the chromatically separated light emerging from the lens. These minute irregularities may also be created on the surface of the lens by grinding and polishing.

The treatment above described may be applied to any one or more of the active surfaces of the unit, which, in most instances, will preferably be a refracting surface and in our preferred constructions is so illustrated. The function of the irregular surface or surfaces is to introduce a specific amount of controlled diffusion, which acts to mix or reunite the various wave lengths of the light separated by the chromatic aberration of the lenses, and also to impair the sharpness of the focus and hence provide the desired increase in spread of the emergent beam axially and to control and modify the character of the beam obliquely in the respects above referred to.

Other details and advantages of our invention will appear from the following description when read in connection with the accompanying drawings and its scope will be pointed out in the appended claims.

Fig. 1 is a diagrammatic view showing the excessive divergence of light rays resulting from the use of a reflector and a spherical lens.

Fig. 2 is a diagrammatic view showing minimum divergence of mono-chromatic light obtained by the use of a reflector and a lens corrected for spherical aberration.

Fig. 3 is a diagrammatic view showing the pronounced chromatic aberration and insufficient divergence obtained by the use of a reflector and a lens corrected for spherical aberration.

Fig. 4 is a diagrammatic view showing the manner in which the spread of the return beam is increased and chromatically separated light is diffused by the use of a reflector and a lens of the type to which our invention relates.

Fig. 5 is a central axial section of an embodiment of our invention having a double convex lens the rear surface of which is reflective.

Fig. 6 is a side view, partly in section, of a unit including a plano convex lens corrected for spherical aberration and provided with a concave reflecting element and embodying our invention.

Fig. 7 shows the various dimensions of a unit embodying our invention.

Fig. 8 is a diagrammatic plan, and Fig. 9 a diagrammatic side view of a highway showing a sign and an automobile in different positions with respect thereto.

Fig. 10 is a diagram illustrative of certain effects of our invention on the sectional shape of an oblique beam.

In Fig. 1, we have shown a spherical lens associated with a reflector 11 located approximately at the focal point of the lens on the axis 12—13. As is well known in connection with a lens of this character, a ray of light, as 14, impinging upon the lens from a distant source parallel to the axis 12—13 is refracted both at the surface where the ray enters the lens and at the surface where it emerges, and when this ray is near the axis of the lens it will be reflected from approximately the focal point in the reflector 11 and pass backwardly through the lens, and emerge therefrom, as at 14', in a direction parallel with the entering ray 14. When, however, the impinging rays are located at a considerable distance from the axis, near the outer edge of the lens, as at 15, they will be refracted to a greater extent, and will thus be reflected from the reflector 11 at a point beyond the axis 12—13. Such rays will, therefore, not be returned through the lens toward the source of light in a direction parallel with the impinging ray 15 but in a direction indicated by the rays 15' and 15". Owing to the fact that dispersion will also take place at the refracting surfaces, the returned rays will be chromatically separated or dispersed, the red colors being refracted to a lesser extent as shown at 15' and the blues to a greater extent as shown at 15", with the intermediate colors therebetween.

In Fig. 2, we have shown a plano-convex lens 16 associated with a reflector 17 located at the focal point of the lens on the axis 18—19. The curvature of the convex surface 20—21 of the lens 16 is such that spherical aberration of the lens 16 has been eliminated whereby all rays from homogeneous light impinging upon the surface 20—21, parallel to the axis 18—19 are refracted to a common focal point, and these rays are thereupon reflected backward through the lens and again refracted so that they emerge from the lens in directions parallel to the axis 18—19. Thus impinging rays parallel to the axis 18—19 and located near the axis, as 24, are returned toward the source of light in a direction parallel to the axis, as at 24'. Likewise, due to the correction of this lens for spherical aberration, rays from the homogeneous light, impinging upon the surface 20—21 at a distance from axis 18—19 and parallel thereto, as 25, are reflected back through the lens toward the source of light in a direction parallel to the axis 18—19, as at 25'.

In Fig. 3 we have illustrated diagrammatically the performance of the unit, such as is shown in Fig. 2, upon white light impinging from an axial direction. As is true of units in which the lenses are uncorrected for spherical aberration, the rays at increasing distances from the axis are increasingly broken up into their component colors. Ray 34, for example, which is close to the axis 18—19, will be dispersed to a negligible extent and it is therefore illustrated as emerging on the opposite side of the axis along line 34' parallel therewith without dispersion. An outside ray 35, however, will experience considerable dispersion and will be reflected so as to emerge on the opposite side of the axis in a direction generally parallel thereto, but chromatically separated so that the entire cone of light will consist of separated color bands within the beam contained between 35' and 35".

In Fig. 4 we have shown a simple plano-convex lens 36 corrected for spherical aberration and associated with a suitable reflector 37 positioned at the approximate focal point of the lens on the axis 38—39. The convex surface of the lens is shown at 40—41 and the plane surface at 42—43.

In order to overcome the objectionable dispersion which is apparent to an observer in front of a reflecting device of the character illustrated in Fig. 3 and illuminated with white light, we slightly roughen the convex surface as indicated at 44. This roughening is of sufficient extent to mix or diffuse the chromatically separated light rays as they emerge from the surface 40—41 upon being returned through the lens by the reflector 37. The minute irregularities formed in the convex surface 40—41 when it is so roughened constitute a great number of independent refracting surfaces so that any ray from a distant source of white light and impinging upon the surface 40—41 toward the outer edge of the lens and in a direction substantially parallel to the axis 38—39 will, after reflection, be returned through the lens and emerge therefrom with the chromatically separated light diffused or mixed as indicated at 45' so that the returned rays appear to an observer as white light instead of light of different colors depending upon the location of the observer transversely of the axis 38—39. As indicated, this diffusion also serves to control the characteristics of the emergent beam, the character of this control being determined by the selected dimensions of the depressions.

While within the purview of our invention the purposes may be accomplished with more or less satisfaction by roughening any or all of the active surfaces, we have found that desirably the treatment may be confined to either the convex surface 40—41 or the plane surface 42—43, or both. From a practical standpoint, however, we find it more convenient to roughen the convex surface. In molding a simple lens of this character, it is comparatively easy to roughen the face of the mold corresponding to the convex surface of the lens, and in most cases the plane surface 42—43 may be ground and polished in the usual way.

Inasmuch as chromatic separation is most noticeable near the margin of the lens, the minute irregularities or roughened surface need not be provided on that portion of the lens near to the axis 38—39, and it will usually be sufficient, from a practical standpoint, to produce these irregularities in the surface near the edge of the lens. It may also be advisable in some cases to increase the degree of roughness from the axis outwardly toward the edge of the lens as we have illustrated in Figs. 4 and 7. The reason for this will be apparent inasmuch as the effect of dispersion is more pronounced as the distance from the axis toward the edge of the lens increases.

The unit shown in Fig. 5 consists of a single unitary lens 50, the rear surface 51 of which is spherical and backed with a reflecting layer 52 of silver, which in turn may be backed by a protective and supporting layer 53 of copper or other metal. The front surface 54 is convex and aspherical in form and so designed as to correct the lens for spherical aberration as is well known. In accordance with our invention the refracting surface 54 is roughened a slight amount so that the cones of differently colored light which would normally be formed by the chromatically uncorrected lens will be diffused and mixed to such an extent as to be indistinguishable and the reflected light will appear substantially white to an observer irrespective of his location so long as he is within the field of divergence of the returned light.

One way in which the roughening may be applied to the surface and particularly to the rear surface 51 of a lens such as in Fig. 5, where it is curved and constitutes the reflecting surface, is to form first a spherical mold, then roughen this with an emery powder which will form in the mold roughnesses greater than are finally desirable in the lens surface. When this mold is used with buttons of heated and softened, but not molten, glass, the softened glass does not entirely fill the interstices between the rough particles of the mold but forms minute lenticular convexities in the surface of the glass. When this is silvered, it forms a reticulated reflecting surface introducing the desired diffusion. The size of the depressions in the reflecting surface should not be greater than the size of the image of a distant light source falling thereon.

The embodiment illustrated in Fig. 6 comprises a plano convex lens 55 having a tapered cylindrical body portion, a convex front surface 56 and a plane rear surface 57, and a concave reflector 58 having a cylindrical portion 59 and a flat annular peripheral portion or brim 60 adapted to rest against the plane end of the lens. The axial length of the cylindrical portion 59 is so chosen that the reflecting surface 58 is positioned at or near the focus of the lens. The reflector 58 may be secured in position against the rear surface 57 of the lens 55 by any suitable means; such as a cap 62 enclosing the reflector and having an internal shoulder 64 engaging the flange 60 and a marginal flange 63 spun over the tapered walls of the lens 55.

As illustrated, the aspherical surface 56 of the lens 55 is provided with a plurality of concentric grooves 61 which function to introduce a controlled amount of diffusion into the reflected light thereby obviating the objectionable effect of chromatic aberration of the white light generally used in connection with such devices.

In the embodiment illustrated in Fig. 6 the concentric grooves have been greatly exaggerated as to size and while our invention may be incorporated in reflecting units of any desired size, a specific construction which has been found to give satisfactory results will be described in detail in connection with Fig. 7. The lens has a diameter of about 16 mm. and sixteen annular concentric grooves are made, the center of the innermost groove being distant from the axis about 2 mm. The width of this first groove is about .3 mm. and each successive groove is progressively wider up to about the tenth groove where it is .5 mm wide and the remainder of the grooves are all made .5 mm. wide. The radii of all the grooves are approximately 24 mm. and we have found that this introduces into the unit an amount of diffusion such that the reflected light as viewed by an observer appears to be white light. The focal point of this lens is 7.11 mm. behind the rear surface of the lens.

Referring now to Figs. 8 to 10, certain other advantages of our own unit will be described. In Figs. 8 and 9 is shown a highway H, having a reflecting sign S beside it. An automobile is shown at three different positions A, B, and C along the highway. It is obvious that, as the automobile nears the sign, the angle of the light projected from its headlights upon the sign becomes more and more oblique with respect to the axis of the unit. Lines connecting the sign and the midpoint between the headlights of the different positions in a horizontal plane are shown in Fig. 8. It is also obvious that the beams from the sign, in order to include the driver within the field of illumination, need only be relatively narrow at a considerable distance and become wider as the automobile approaches the sign. In other words, assuming that in most instances the sign is located substantially on the level of the headlights, the angular divergence of the reflected beams should be greater and greater as the obliquity shown in Fig. 8 increases. At great distances, very narrow beams and maximum intensity are desired and at short distances wider beams are required and intensity is less important.

It is also to be noted that a beam reflected obliquely from a unit of the type here under discussion is not ordinarily of regular shape. That is, if the light source were surrounded by a screen, the light reflected upon the screen would not be a uniform circle but would be of irregular shape, due primarily to astigmatism.

Considering an automobile at position B, the beams reflected by a reflective unit might each have a cross shape of useful illumination centered about the headlights; but, as is apparent from an inspection of the figures, the driver's head would be midway between the headlights and in an area outside the useful illumination originating from each.

This is indicated in Fig. 10, where the lights are shown at O and O', about each of these being a cross shaped area X and X', which may overlap more or less. The driver's head D will, at certain positions of the vehicle, be outside the usefully illuminated area. When a unit made in accordance with our invention is used, the irregularities or rings introduce a controlled amount of diffusion that tends to destroy the irregular pattern and give throughout an area approximately circular in shape indicated at Z and Z', a reasonable uniform illumination and free from pronounced patterns, so that the driver will not by moving his head from side to side, markedly vary the visibility of the sign.

It is well understood that, due to the astigmatism of the lens, the oblique divergence may be controlled in either a vertical or horizontal plane by altering the longitudinal location of the reflector in the vicinity of the focus of an obliquely incident beam. The effect of this adjustment is to produce greater irregularities in the pattern of the beam cross section. This condition is illustrated by F and F' showing the effect upon the pattern when the reflector is located in focus for a horizontal plane of obliquely incident light but is distinctly out of focus for a vertical plane, due to astigmatism. The reversed condition is shown by K and K' when the reflector is in focus for a vertical plane of obliquely incident light and is out of focus for a horizontal plane. Obviously neither adjustment produces a pattern which includes the driver's eyes.

By the use of our invention, desirable results may be obtained by locating the reflector substantially half way between the focal points for oblique vertical and horizontal planes of light and modifying the divergence by the use of diffusion, which tends to produce a substantially circular pattern, as shown by Z and Z', which includes the driver's eyes regardless of their location laterally.

All of the desired attributes described here are particularly well attained when the roughnesses or irregularities are in the form of smooth grooves formed of predetermined sizes so dimensioned as to introduce a controlled degree of diffusion; spreading the beam substantially to the angle desired but diffusing the rays within that angle to constitute a uniformly illuminated beam of approximately circular cross section with greatly reduced chromatic aberration and the divergence of which increases with the obliquity of the beam.

Another feature of our invention not previously explained is the effect of controlled diffusion on the functional uniformity of lenses made in accordance with our invention. When lenses for autocollimating purposes are made with polished surfaces free from diffusion by a molding process, certain resulting inaccuracies develop, which cannot be eliminated, such as, slight distortions of the surfaces and variation in lens thickness. These inaccuracies, particularly in lenses corrected for spherical aberration, result in autocollimating catadioptric units which function erratically; that is, certain units will appear relatively bright while others will appear relatively dim. This conditon, of course, impairs the legibility of the legend in which the units are employed.

The introduction of controlled diffusion, as disclosed by our invention, creates what might be termed a leveling effect, which overcomes manufacturing distortions and reduces the units to a uniform condition with the result that the units all appear to an observer to be of the same degree of brightness. This uniformity is essential in order to produce maximum legibility of lettering or legends in which the units are used.

The invention has been explained by describing what are now considered its preferred embodiments but it is obvious our invention may be utilized as a means of controlling divergence and/or for rendering imperceptible the effects of chromatic aberration wherever found regardless of whether or not the lens is corrected for spherical aberration and we contemplate as included in our invention all modifications and equivalents within the scope of the appended claims.

What we claim as new and desire to secure by Letters Patent of the United States, is:—

1. An autocollimating catadioptric unit comprising the combination of a simple collecting lens having an aspherical anterior face to correct for spherical aberration and a reflector in the rear of the lens, the aspherical face having a smooth central area and the surrounding area provided with a succession of shallow annular grooves concentric with the axis of the lens and increasing progressively in width from the inner toward the outer grooves.

2. An autocollimating catadioptric unit comprising the combination of a collecting lens substantially corrected for spherical aberration and uncorrected for chromatic aberration and a reflector behind the lens, at least one refracting surface of the lens differing from a single optical surface by relatively minute intermittent deviations in such a way that chromatic aberration is rendered imperceptible without substantially influencing the correction for spherical aberration.

3. An autocollimating catadioptric unit comprising the combination of a simple collecting lens having an aspherical anterior face and a plano rear face and a reflector behind the lens, the aspherical surface being smooth in its central area and outwardly therefrom being provided with a succession of contiguous shallow annular grooves concentric with the axis of the lens and increasing progressively in width from the inner toward the outer grooves.

4. A catadioptric unit comprising the combination of a simple collecting lens and a reflector in the rear thereof operative as an autocollimator, the lens having its anterior face aspherical and provided with a multiplicity of shallow grooves concentric with the axis of the lens, the grooves being so dimensioned that a mixing of light rays to a controlled extent is introduced into the system to lessen the effects of chromatic aberration and astigmatism.

5. An autocollimating catadioptric unit comprising the combination of a simple collecting lens having an aspherical anterior face to correct for spherical aberration and a reflector in the rear of the lens, the aspherical face having a smooth central area and the surrounding area provided with a succession of polished shallow annular grooves concentric with the axis of the lens, the dimensions of the grooves being so selected that diffusion to a controlled extent is introduced into the system to lessen the effects of chromatic aberration and astigmatism, and the unit having the property of reflecting back beams oblique to the axis with somewhat greater divergence than beams parallel to the axis.

6. A catadioptric unit comprising the combination of a simple collecting lens and a reflector in the rear thereof and operative as an autocollimator, the lens having its anterior surface of a general contour effective to correct for spherical aberration and tending to render perceptible chromatic aberration, and one surface of the lens having a systematic detail contour effective to mix the differently colored light rays whereby the chromatic aberration is not visually perceptible.

7. A catadioptric unit comprising the combination of a lens and a reflector and operative as an autocollimator, the lens being corrected for spherical aberration and having in one surface a series of minute deformations from a smooth surface, the deformation being of predetermined dimensions sufficient to introduce a controlled amount of diffusion to smother the effects of chromatic aberration and astigmatism but not markedly increasing the angle subtended by a reflected beam centered on the axis of the lens.

8. A catadioptric unit comprising the combination of a lens and a reflector and operative as an autocollimator, the lens being corrected for spherical aberration and having in one surface a series of minute annular deformations from a smooth surface, the deformation being of predetermined dimensions sufficient to introduce a controlled amount of diffusion to overcome the effects of chromatic aberration and astigmatism but not markedly increasing the angle subtended by an axially centered reflected beam, the deformations from the center to the edge of the lens varying progressively in extent.

9. A catadioptric autocollimating unit comprising the combination of a simple collecting lens and a reflector in the rear thereof occupying substantially the focal field of the lens, the lens having at least one surface shaped to minimize spherical aberration particularly with respect to light incident parallel to its axis, one active surface of the system being provided with a multiplicity of minute deviations from its true optical contour to the extent necessary to reblend light which ordinarily separates into its chromatic components due to the existence of chromatic aberration, so that after traversing the system the light emitted is substantially of its original color without appreciably increasing its total divergence, the said deviations being systematically arranged and of such size and shape as to be capable of being formed by individual polishing.

10. A catadioptric unit comprising the combination of a simple collecting lens and a reflector in the rear thereof and operative as an autocollimator, the lens having its anterior face conforming to an aspherical outline to correct for spherical aberration and provided with relatively minute annular deviations from the true theoretical smooth contour of the surface whereby chromatic aberration is rendered imperceptible, said deviations being of determined polishable shape and very smooth as a result of a polishing operation whereby no general diffused or scattered light is introduced thereby.

11. A catadioptric unit comprising the combination of a simple collecting lens and a reflector in the rear thereof operative as an autocollimator, the lens having its anterior face aspherical and provided with a multiplicity of shallow grooves concentric with the axis of the lens and very smooth as a result of a polishing operation, the grooves being so dimensioned that they introduce controlled diffusion to an extent necessary to smother the effects of chromatic aberration and astigmatism in the reflected beam but not markedly increasing the angle subtended by an axially centered reflected beam.

12. An autocollimating catadioptric unit comprising the combination of a simple collecting lens having an aspherical anterior face to correct for spherical aberration and a reflector in the rear of the lens, the aspherical face having a smooth central area and the surrounding area provided with a succession of shallow toric grooves concentric with the axis of the lens and having a smoothness produced as a result of a polishing operation, the grooves being of such a nature as to produce controlled color mixing.

13. A catadioptric unit comprising the combination of a simple collective lens substantially corrected for spherical aberration and a reflector in the rear thereof occupying substantially the mean focal point of all planes of axially centered and obliquely incident light, one of the active optical surfaces having minute irregularities of polishable contour to introduce into a reflected beam a controlled amount of mixing of light rays to an extent necessary to smother the effects of chromatic aberration and astigmatism in the reflected beam but not markedly increasing the angle subtended by an axially centered reflected beam.

CHARLES W. FREDERICK.
RICHARD W. LUCE.